United States Patent
Shimizu (10) Patent No.: US 10,356,269 B2
(45) Date of Patent: Jul. 16, 2019

(54) IMAGE READING APPARATUS AND ORIGINAL SIZE DETECTION METHOD

(71) Applicant: CANON KABUSHIKI KAISHA, Tokyo (JP)

(72) Inventor: Hiromu Shimizu, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/954,320

(22) Filed: Apr. 16, 2018

(65) Prior Publication Data
US 2018/0309895 A1 Oct. 25, 2018

(30) Foreign Application Priority Data
Apr. 25, 2017 (JP) ................................ 2017-086671

(51) Int. Cl.
*H04N 1/40* (2006.01)
*H04N 1/00* (2006.01)
*H04N 1/60* (2006.01)

(52) U.S. Cl.
CPC ..... *H04N 1/00997* (2013.01); *H04N 1/00551* (2013.01); *H04N 1/00708* (2013.01); *H04N 1/00816* (2013.01); *H04N 1/00835* (2013.01); *H04N 1/6088* (2013.01)

(58) Field of Classification Search
None
See application file for complete search history.

(56) References Cited

U.S. PATENT DOCUMENTS

| | | | |
|---|---|---|---|
| 8,134,753 B2 * | 3/2012 | Ishido | H04N 1/00551 358/449 |
| 8,174,737 B2 | 5/2012 | Kato et al. | 358/474 |
| 9,716,803 B2 * | 7/2017 | Sato | H04N 1/00713 |
| 9,888,142 B2 * | 2/2018 | Kusuhata | H04N 1/00684 |
| 9,979,845 B2 * | 5/2018 | Maeda | H04N 1/00551 |
| 2010/0033769 A1 * | 2/2010 | Shinkawa | H04N 1/00681 358/474 |
| 2013/0044357 A1 * | 2/2013 | Igawa | H04N 1/0071 358/474 |
| 2015/0009518 A1 * | 1/2015 | Kashiwagi | H04N 1/00708 358/1.13 |
| 2016/0373599 A1 * | 12/2016 | Misaka | H04N 1/00708 |
| 2017/0331968 A1 * | 11/2017 | Togashi | H04N 1/00037 |

OTHER PUBLICATIONS

U.S. Appl. No. 15/839,558, filed Dec. 12, 2017.
U.S. Appl. No. 15/839,564, filed Dec. 12, 2017.
U.S. Appl. No. 15/839,568, filed Dec. 12, 2017.
U.S. Appl. No. 15/954,310, filed Apr. 16, 2018.

* cited by examiner

Primary Examiner — Dung D Tran
(74) Attorney, Agent, or Firm — Venable LLP (57) ABSTRACT

An image reading apparatus includes a reading unit, which includes an illumination portion for irradiating an original placed on an original table with light and a light receiving portion for receiving irradiated light reflected from the original. The image reading apparatus reads the original one line at a time in a main scanning direction according to the received reflected light. The image reading apparatus determines the size of the original based on the reading result of the reading unit. The image reading apparatus shortens, in a case where the platen cover is in an open state, the lighting duration of the illumination portion than the duration where the platen cover is in a close state.

14 Claims, 7 Drawing Sheets

IMAGE READING APPARATUS AND ORIGINAL SIZE DETECTION METHOD

BACKGROUND OF THE INVENTION

Field of the Invention

The present invention relates to an image reading apparatus configured to read an image formed on an original (hereinafter referred to as "original image") and an original size detection method.

An image reading apparatus configured to read an original image while moving a reading unit in a sub-scanning direction with respect to an original placed on an original table can detect a size of the original based on the read original image. For example, the image reading apparatus detects an original edge (original end portion) from the read original image to determine the original size based on a result of the detection. In this detection method, there is a possibility of erroneously detecting an edge of the original in a case where dust, hair or other dirt adheres to the original holding member attached to a back side of a platen cover or the original table. U.S. Pat. No. 8,174,737 discloses an image reading apparatus which prevents erroneous detection of an edge of an original. The image reading apparatus reads the lower area of the original placed on the original table, and extracts a group of edge points corresponding to the edge of the original from the image data, which is obtained as a result of reading of the lower area. The image reading apparatus estimates the original region in the image data of the edge by linear approximation of the extracted group of edge points. The image reading apparatus calculates an occupancy rate of the edge points in a region outside the original region of the edge image data, and evaluates that accuracy is low in a case where the occupancy rate exceeds a threshold value. In a case where the accuracy is evaluated as low, the image reading apparatus estimates that the size of the original placed on the original table is a predetermined size.

An image reading apparatus described in U.S. Pat. No. 8,174,737 previously scans a partial area of an original table in order to accurately extract an edge of an original. A light source of the reading unit is kept ON while scanning of the original. In a case where an edge of an original is extracted with a platen cover being opened, the light emitted from the light sources, during the scanning of the partial area, directly reaches eyes of a user. The user is dazzled by such light having reached the eyes. Therefore, the present invention provides an image reading apparatus, which is configured to prevent a user from being dazzled even in a case where a size of the original is detected with the platen cover being in an open state.

SUMMARY OF THE INVENTION

An original reading apparatus according to the present disclosure including: an original table for placing an original subjected to reading; a reader, which includes an illumination portion for irradiating a reading position with light, and is configured to read the original while moving the reading position in a first direction beneath the original table; a platen cover mounted to the original table so as to be openable and closable with respect to the original table; an open/close sensor configured to detect an open/close state of the platen cover with respect to the original table; a controller configured to control the illumination portion and to determine the size of the original based on image data output from the reader; wherein the controller is configured to: control the illumination portion to irradiate, in a case where an instruction for reading the original is received with a detection result of the open/close sensor being a first state, a predetermined position with light for a first duration to determine the size of the original based on image data output from the reader; and control the illumination portion to irradiate, in response to a change of the detection result of the open/close sensor from the first state to the second state, the reading position with light for a second duration to determine the size of the original based on image data output from the reader, while moving the reading position from the predetermined position in a second direction; wherein the predetermined position is a position between a front-end and a rear-end of the original placed on the original table, the second direction being opposite to the first direction, and the second duration being shorter than the first duration.

Further features of the present invention will become apparent from the following description of exemplary embodiments (with reference to the attached drawings).

DESCRIPTION OF THE EMBODIMENTS

An embodiment of the present invention is described below in detail with reference to the drawings.

Overall Configuration

Figure 1:
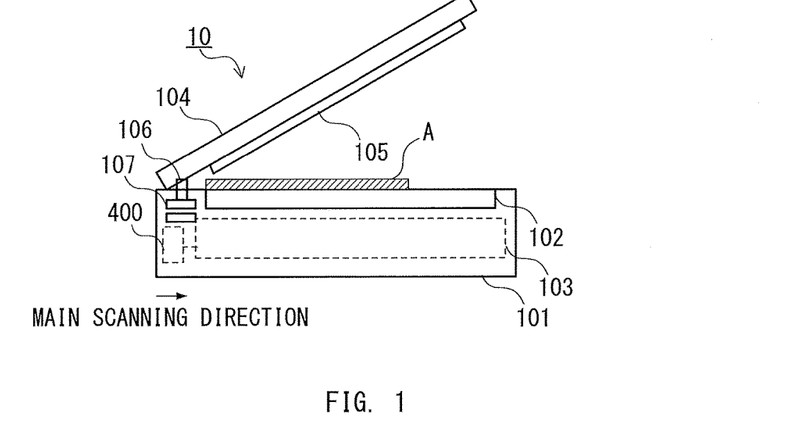
FIG. 1 is a configuration diagram of an image reading apparatus.
Figure 2:
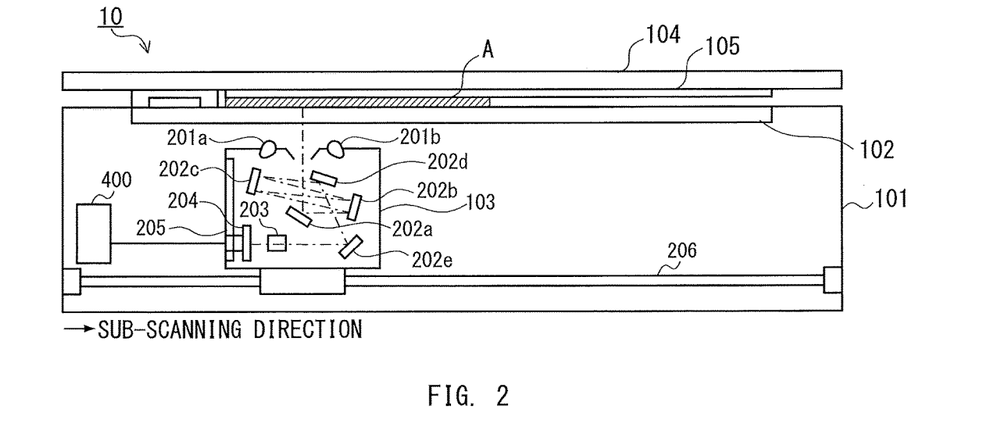
FIG. 2 is a configuration diagram of the image reading apparatus.

FIG. 1 and FIG. 2 are configuration diagrams of an image reading apparatus, which is an example of a original reading apparatus, according to an embodiment of the present invention. An image reading apparatus 10 includes a box-shaped casing 101, an original table 102 on which an original A to be read is to be placed, and a platen cover 104 having mounted thereon an original pressing member 105 configured to press the original A.

The casing 101 accommodates a reading unit 103, which reads an original image from the original A, and a control unit 400. The original table 102 is formed of a transparent member, for example, glass. The original A is placed so that its surface to be read faces toward the original table 102 side. The platen cover 104 can be changed in mounting angle with respect to the casing 101. That is, the platen cover 104 is mounted to the casing 101 so as to be openable and closable with respect to the original table 102. The casing 101 is provided with a platen cover open/close detection flag 106, which detects an open/close state of the platen cover 104 with respect to the original table 102, and a platen cover open/close sensor 107. A position of the platen cover open/ close detection flag 106 changes due to open/close of the platen cover 104, and an output of the platen cover open/close sensor 107 changes accordingly. A surface of the original pressing member 105 on a side of pressing the original A has a white color so that a region outside the region of the original A does not become black at the time of reading.

The reading unit 103 is a reader which includes illumination portions 201a and 201b, reflective mirrors 202a to 202e, an imaging lens 203, a light receiving portion 204, and a sensor board 205. The illumination portions 201a and 201b irradiate the original A with light. The illumination portions 201a and 201b each include a plurality of light emitting elements such as light emitting diodes (LEDs) that are arranged linearly. The reflective mirrors 202a to 202e construct an optical system for introducing the light reflected from the original A to the imaging lens 203. The imaging lens 203 images the reflective light introduced by the reflective mirrors 202a to 202e to a light receiving surface of the light receiving portion 204.

The light receiving portion 204 is a sensor which outputs an electrical signal based on the reflective light received at the light receiving surface. The electrical signal is an analog signal representing the original image read from the original A. The light receiving portion 204 includes a plurality of photoelectric conversion elements such as charge coupled device (CCD) sensors that are arranged in the same direction as a row of the light emitting elements. The light receiving portion 204 is mounted on the sensor board 205. The sensor board 205 is connected to a control unit 400, and transmits the analog signal output from the light receiving portion 204 to the control unit 400. The configuration of the control unit 400 is described later.

The reading unit 103 having such a configuration reads the original image with a direction of arrangement of the light emitting element rows of the illumination portions 201a and 201b and the photoelectric conversion element row of the light receiving portion 204 serving as a main scanning direction. The reading unit 103 is provided to a rail 206, and reads the original image while moving on the rail 206. This means that a reading position moves, beneath the original table 102, in the direction along the rail 206 as the reading unit 103 moves on the rail 206. The moving direction of the reading unit 103 serves as a sub-scanning direction orthogonal to the main scanning direction.

Figure 3:
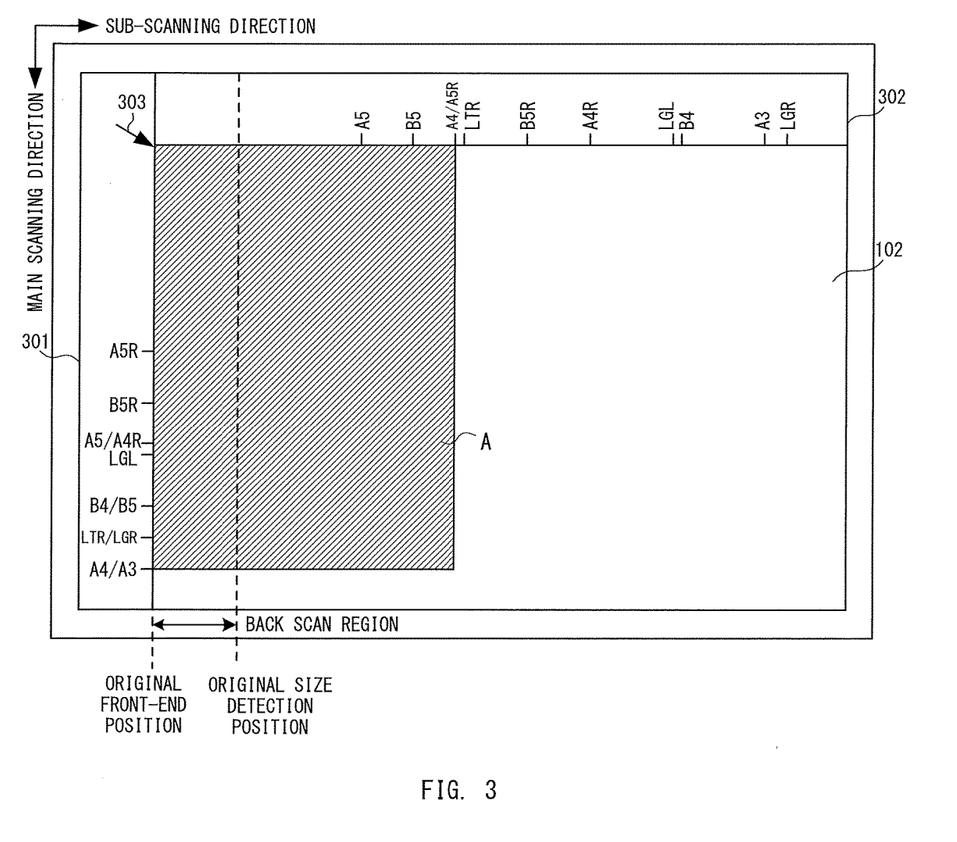
FIG. 3 is an explanatory diagram of an original table side of a casing.

FIG. 3 is an explanatory diagram of the original table 102 side of the casing 101. In the surrounding of the original table 102, a main scanning original size index 301, a sub-scanning original size index 302, and a reference position 303 used when the original A is placed are marked. The original A is placed on the original table 102 so that its corner portion matches with the reference position 303. The main scanning original size index 301 is an index of a size in the main scanning direction of the original A placed so as to match with the reference position 303. The sub-scanning original size index 302 is an index of a size in the sub-scanning direction of the original A placed so as to match with the reference position 303. In the example of FIG. 3, an A4-sized original A is placed on the original table 102.

The original size of the original A in the main scanning direction is started to be detected from an original size detection position. The original A is started to be read from an original front-end position when the original image is read. The original size detection position is, in the sub-scanning direction, a position between a front-end position and a rear-end position of the original having a predetermined size. Further, the original size detection position is a position separated from the original front-end position in the sub-scanning direction by a predetermined distance. The original front-end position is a position at which an original image is first read when the original A is read.

At the time of detecting the size of the original, when the platen cover open/close sensor 107 detects an open state of the platen cover 104, the control unit 400 controls the reading unit 103, which is at an HP (Home Position), to move to an original size detection position. That is, by moving the reading unit 103 in the sub-scanning direction, the control unit 400 moves the reading position to the original size detection position. At this point, the HP position is at the left side of the front-end position of the original in FIG. 2. After the movement of the reading unit 103, the control unit 400 reads the original A for a predetermined number of lines while controlling the reading unit 103 to move from the original size detection position to the original front-end position (back scanning). That is, by moving the reading unit 103 in a back-scan direction opposite to the sub-scanning direction, the control unit 400 moves the reading position to the original size detection position. The control unit 400 detects an original edge of the original A based on a reading result by the reading unit 103 to determine the size of the original based on the original edge.

Figure 4:
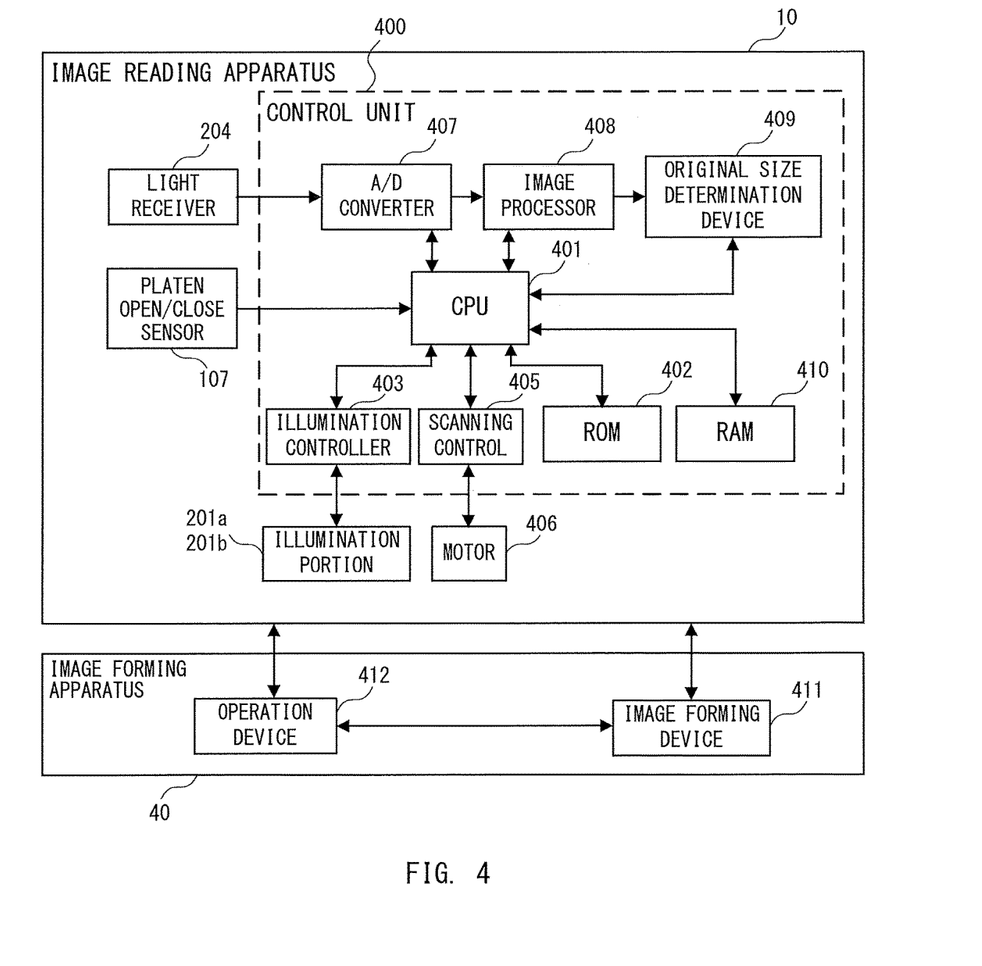
FIG. 4 is an explanatory diagram of a control unit.

FIG. 4 is an explanatory diagram for illustrating the control unit 400. The illumination portions 201a and 201b and the light receiving portion 204 of the reading unit 103, the platen cover open/close sensor 107, and a motor 406 are connected to the control unit 400. The motor 406 is a drive source for moving the reading unit 103 along the rail 206. The image reading apparatus 10 is connected to an image forming apparatus 40 such as a copying machine, a printer, or a multifunction peripheral.

The control unit 400 is a computer system including a central processing unit (CPU) 401, a read only memory (ROM) 402, and a random access memory (RAM) 410. The CPU 401 executes a computer program stored in the ROM 402 with use of the RAM 410 as a work area, to thereby control the operation of the image reading apparatus 10. The control unit 400 further includes an illumination controller 403 and a scanning controller 405 for controlling the operation of the reading unit 103. The control unit 400 further includes an A/D converter 407 for detecting the original size of the original A, an image processor 408, and an original size detection device 409. The control unit 400 may be achieved by discrete components or one-chip semiconductor products. The one-chip semiconductor products can be achieved by a micro-processing unit (MPU), an application specific integrated circuit (ASIC), and a system-on-a-chip (SOC).

The illumination controller 403 is controlled by the CPU 401 to control the operation of turning on and off the illumination portions 201a and 201b. In this embodiment, the illumination controller 403 changes a ON/OFF state of the illumination portions 201a and 201b in accordance with a detection result by the platen cover open/close sensor 107. When the platen cover 104 is in an open state, the illumination controller 403 reduces the total amount of light irradiated from the illumination portions 201a and 201b, as compared to the total amount of light when the platen cover 104 is in a closed state. As a result, the total amount of light reaching the eyes of a user from the illumination portions 201a and 201b can be reduced, and the user is prevented from feeling dazzling. "Total amount of light" is an amount expressed by, for example, a light amount irradiated from the illumination portions 201a and 201b and lighting time thereof, and is a sum of a light amount irradiated on the original A. Specifically, the illumination controller 403 reduces the light amount or shorten lighting time of the illumination portions 201a and 201b in a case where the platen cover open/close sensor 107 detects that the platen cover 104 is in the open state, as compared to a case where the platen cover open/close sensor 107 detects that the platen cover 104 is in the close state. The scanning controller 405 is controlled by the CPU 401 to transmit a drive signal to the motor 406, to thereby move the reading unit 103 along the rail 206 in the sub-scanning direction at a predetermined speed.

The A/D converter 407 is controlled by the CPU 401 to receive, from the light receiving portion 204, the analog signal representing the original image. The A/D converter 407 converts the analog signal into a digital signal, and transmits the signal to the image processor 408. The image processor 408 is controlled by the CPU 401 to subject the digital signal acquired from the A/D converter 407 to various types of image processing, and generates image data representing the original image read from the original A. The image data is transmitted from the control unit 400 to, for example, the image forming apparatus 40 or a personal computer. The original size detection device 409 is controlled by the CPU 401 to detect the original edge of the original image based on the image data generated by the image processor 408, and determine the original size of the original A.

The image forming apparatus 40 includes an image forming device 411 and an operation device 412. In accordance with image data acquired from the control unit 400, the image forming device 411 forms an image represented by the image data on a recording material such as a sheet. The image forming device 411 forms an image on a recording material having a size corresponding to the original size determined by the control unit 400. With such action, the original image read by the image reading apparatus 10 is formed on a recording material having an appropriate size. The operation device 412 is a user interface including an input device and an output device. The input device includes, for example, various operation keys or a touch panel. The output device includes, for example, a display. The operation device 412 provides information to a user through the output device, and receives instructions from a user through the input device. The operation device 412 transmits the received instructions to the control unit 400 or the image forming device 411. The operation device 412 receives an original reading instruction which instructs reading of an original from the user via an input device or the like. The operation device 412 may be provided to the image reading apparatus 10.

Figure 5:
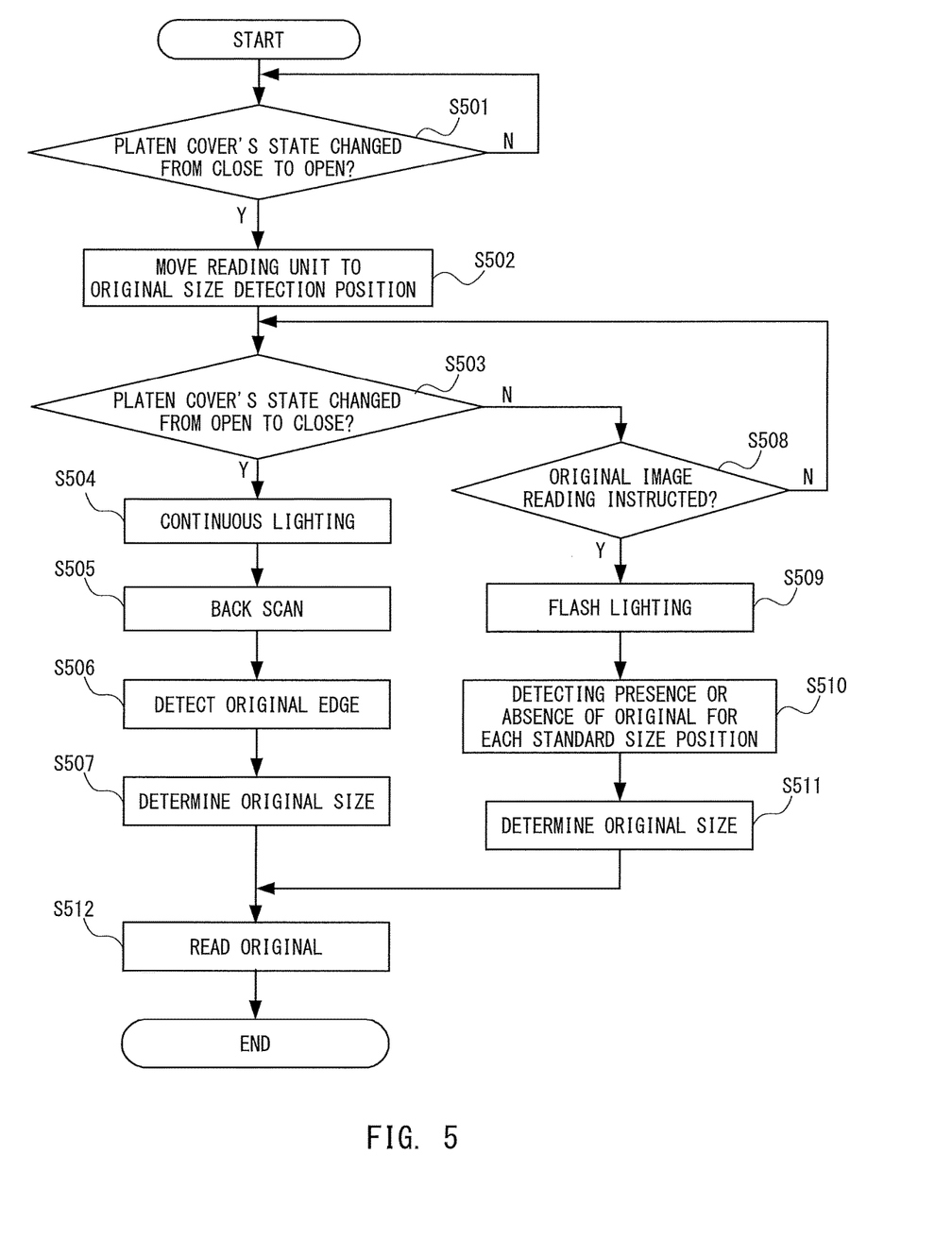
FIG. 5 is a flowchart for illustrating original image reading processing including original size detection processing.

FIG. 5 is a flowchart for illustrating original image reading processing including original size detection processing performed by the image reading apparatus 10.

The control unit 400 determines whether or not the state of the platen cover 104 is changed from the close state to the open state in accordance with a detection result acquired from the platen cover open/close sensor 107 (Step S501). When the state of the platen cover 104 is changed to the open state (Step S501: Y), the control unit 400 controls the reading unit 103 to move to the original size detection position (Step S502). At this time, a user places the original A on the original table 102 so that a corner portion of the original A matches with a reference position 303. After that, the control unit 400 determines whether or not the state of the platen cover 104 is changed from open state to the close state in accordance with a change in detection result acquired from the platen cover open/close sensor 107 (Step S503).

When the state of the platen cover 104 is changed to the close state (Step S503: Y), the control unit 400 controls the reading unit 103 to move from the original size detection position to the original front-end position and to continuously irradiate the illumination portions 201a and 201b of the reading unit 103 with light (Step S504). With this action, the control unit 400 performs back scanning of reading the original A for a predetermined number of lines (Step S505). Through the back scanning, the control unit 400 acquires an analog signal representing an original image for a plurality number of lines from the reading unit 103.

The control unit 400 converts the analog signal representing the acquired original image into a digital signal through use of the A/D converter 407 and performs image processing with respect to the digital signal through use of the image processor 408, to thereby generate image data. The control unit 400 detects an original edge of the original image through use of the original size detection device 409 based on the image data (Step S506). Details of the original edge detection processing are described later. The control unit 400 determines the size of the original A based on the detected original edge (Step S507).

In a case where the state of the platen cover 104 does not change into the closed state (Step S503: N), the control unit 400 determines whether reading of the original image is instructed from the operation unit 412 (Step S508). Some users may provide an instruction for reading the original image via the operation unit 412 before changing the platen cover 104 to the close state. In this case, processing for a case where the state of the platen cover 104 is not changed to the close state is performed.

In a case where reading of the original image is instructed before the state of the platen cover 104 is changed to the close state (Step S508: Y), if the original edge detection is performed at this situation, back-scanning is performed where the light of the illumination portion 201 directly reaches the user's eyes. Therefore, the user feels the light from the illumination portion 201 dazzling. Therefore, the control unit 400 does not control the illumination portion 201 to continuously irradiate light, and the control unit 400 controls the illumination portion 201 to perform flash lighting with short lighting time (Step S509). At this time, the control unit 400 does not move the illumination portion 201, and the control unit 400 controls the illumination portion 201 to perform flash lighting at the original size detection position. The lighting time of the flash lighting performed in Step S509 is shorter than the lighting time in the processing of Step S504 and processing of Step S505. Therefore, it is possible to suppress the dazzle of the light irradiated from the illumination portion 201 felt by the user. For example, the illumination portion 201 is lit only once when it is controlled to perform the flash lighting. When the illumination portion 201 is controlled to irradiate light while moving, it is necessary to stabilize the moving speed thereof. This increases the time necessary for performing the entire original size detection process. By inhibiting movement of the illumination portion 201 when it is controlled to perform the flash lighting, it is possible to decrease the time necessary for performing the entire original size detection process.

The control unit 400 detects presence or absence of the original A for each standard size position in the main scanning direction indicated by the main scanning original size index 301 (Step S510). In the flash lighting, only the reading result corresponding to the number of lines (for example, the number of lines corresponding to the number of light receiving element arrays) read by one reading process performed by the reading unit 103 is obtained. As a result, in a case where an original edge detection such as the processing of Step S506 is performed, the accuracy of the detection is decreased as compared with the accuracy in an original edge detection with continuous irradiation of light. Therefore, the control unit 400 compares the luminance at the standard size position in the main scanning direction with a predetermined threshold value and binarizes the luminance. This binarization is performed based on the reading result of the number of lines read in one reading process with the flash lighting. Since the original A is generally white, the brightness of the same is increased. Since the platen cover 104 is in the open state at a position where there is no original A, the light from the illumination portions 201a and 201b is not reflected, thus the luminance is decreased. Therefore, the control unit 400 can determine that the original A is present at a position where the luminance is high, and the control unit 400 can determine that there is no original A at the position where the luminance is low. The control unit 400 determines the original size by determining the position in which the original is present, using the binarized luminance (Step S511).

After the determination of the original size, the control unit 400 controls an operation of the reading unit 103 to read the original image of the original A placed on the original table 102 (Step S512). A user places the original A on the original table 102, and thereafter operates the operation device 412 to give an instruction of reading an original image to the image reading apparatus 10. In a case where the platen cover 104 is close (i.e., changed to the close state at S503), the operation of the operation unit 412 by the user is performed during the processing of Step S504 to Step S507. In a case where the platen cover 104 is open (i.e., changed to the open state at Step S503), the operation of the operation unit 412 by the user is performed during the processing of Step S508. The operation device 412 transmits an instruction of reading an original image to the control unit 400 in accordance with the operation by the user. The control unit 400 acquires the instruction of reading an original image from the operation device 412 to start reading an original image.

With the processing described above, an original size of the original A placed on the original table 102 is determined, and an original image is read. Image data representing the read original image is, for example, transmitted to the image forming apparatus 40 and used for image forming processing on a recording material by the image forming device 411.

When the platen cover 104 is in the close state, the brightness at the position where there is no original A increases due to the white color of the original pressing member 105. Therefore, it is not possible to determine the presence or absence of the original A by the binarization of luminance. Therefore, when the platen cover 104 is in the close state, the control unit 400 performs a back-scan to detect the edge of the original. When the platen cover 104 is in the open state, the luminance decreases in the area where there is no original A for the reason described above. Therefore, the control unit 400 can determine presence or absence of the original A by the binarization of the luminance. Therefore, the control unit 400 does not need the reading result of a plurality of lines, and, even if the lighting time is shortened, the original size can be detected without any problems.

Figure 6:
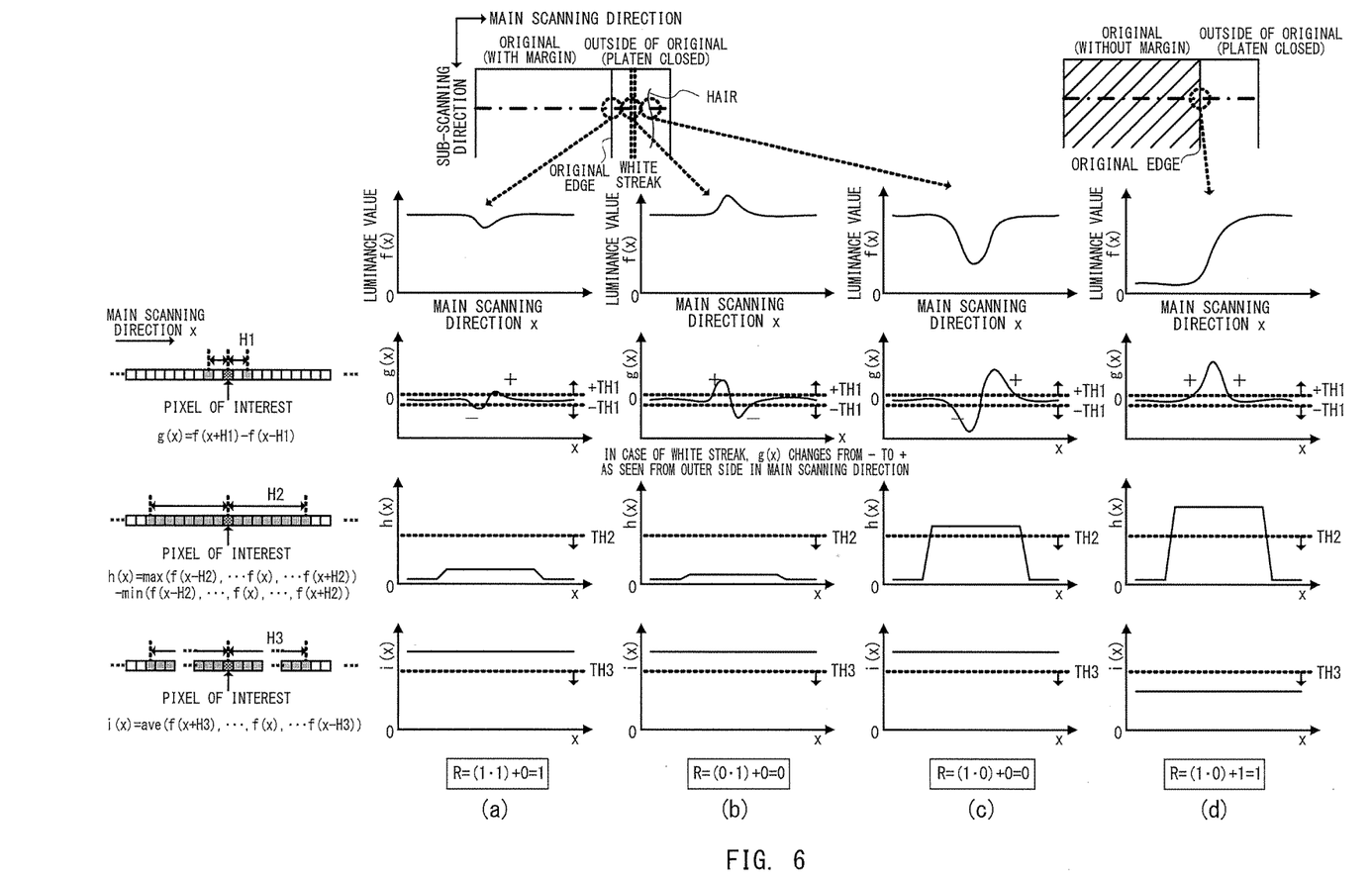
FIG. 6 is an explanatory diagram for illustrating original edge detection processing.
Figure 7:
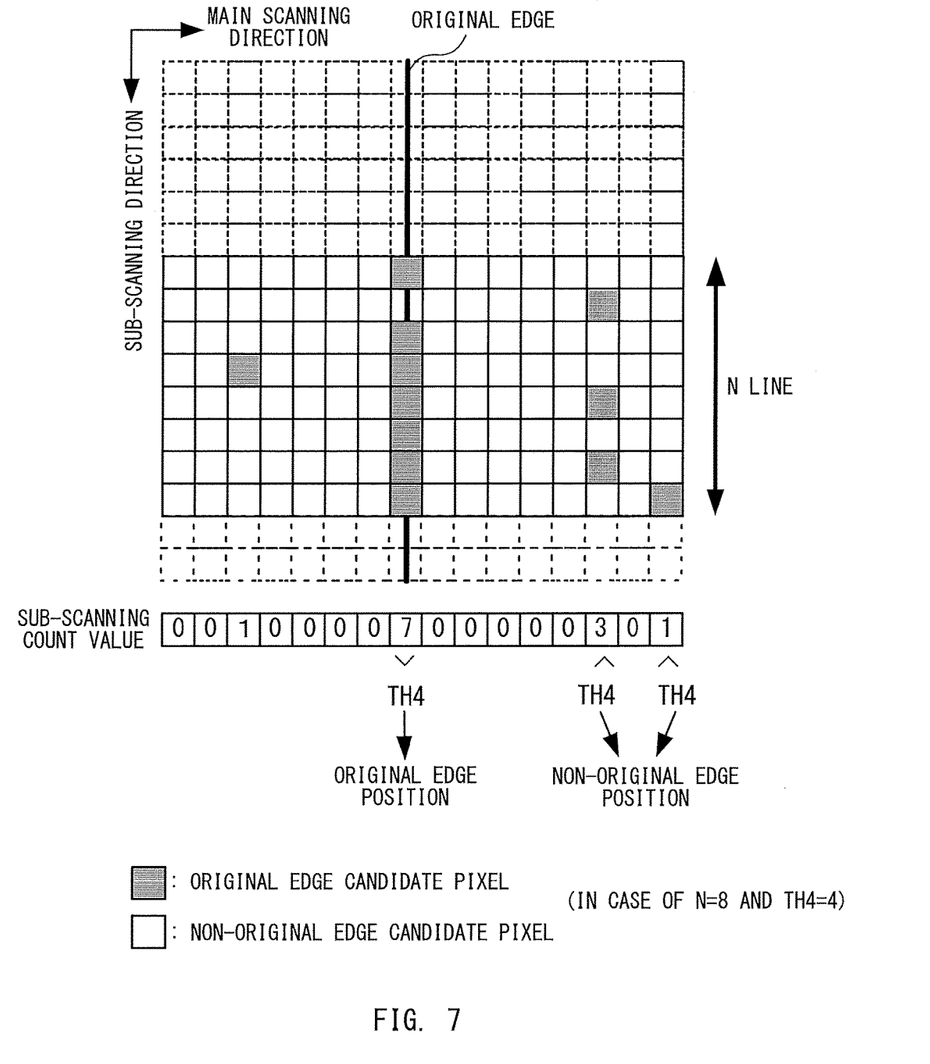
FIG. 7 is an explanatory diagram for illustrating original edge detection processing.

FIG. 6 and FIG. 7 are explanatory diagrams for illustrating the original edge detection processing in Step S506. The original size detection device 409 of the control unit 400 performs determination for each pixel to determine whether or not the pixel is an original edge, to thereby detect the original edge. The control unit 400 performs the following detection to detect the original edge with high accuracy even when dust, hair, or other dirt adheres to the original pressing member 105.

The original size detection device 409 uses three determination expressions to determine whether or not a pixel of interest subjected to the determination of the original edge is a pixel of the original edge (original edge pixel). A position of the pixel of interest in the main scanning direction is represented by "x", and a luminance value of the pixel of interest is represented by "f(x)". A luminance value for each pixel is included in image data. A first determination expression expresses a luminance difference value g(x) being a difference value between luminance values f(x+H1) and f(x−H1) of pixels located at two positions (x+H1) and (x−H1) that are each separated from the pixel of interest in the main scanning direction by a predetermined first distance H1.

$$g(x)=f(x+H1)-f(x-H1)$$

A second determination expression expresses a difference value h(x) between a maximum luminance value and a minimum luminance value of pixels within a range of a second distance H2, which is larger than the first distance H1, from the pixel of interest in the main scanning direction.

$$h(x)=\max(f(x-2H),\ldots,f(x),\ldots f(x+H2))-\min(f(x-2H),\ldots,f(x),\ldots f(x+H2))$$

A third determination expression expresses an average value i(x) of luminance values of pixels within a predetermined third distance H3 from the pixel of interest in the main scanning direction.

$$i(x)=\mathrm{ave}(f(x+3H),\ldots,f(x),\ldots,f(x-H3))$$

The original size detection device 409 compares calculation results of the first to third determination expressions with first to third threshold values to perform determination of whether or not a pixel of interest is an original edge pixel.

The light emitting elements of the illumination portions 201a and 201b obliquely irradiate the original A with light. Therefore, a shadow may be caused at the original edge depending on the thickness of the original A. There is a luminance difference between the original edge and the original pressing member 105 due to this shadow. The luminance difference value g(x) is calculated to detect this luminance difference. The first threshold value TH1 is set to a value that enables the luminance value caused by the original edge to be distinguished from the luminance value caused by the original pressing member 105 serving as a background. In the case of the original edge, the absolute value of the luminance difference value g(x) is larger than the first threshold value TH1, and in the case of a part of the original pressing member 105 that is not the original edge, the absolute value of the luminance difference value g(x) is smaller than the first threshold value TH1. The first threshold value TH1 is set considering an original causing less shade and having a small basis weight.

The original size detection device 409 is capable of distinguishing a white streak in accordance with a change in sign of the luminance difference value g(x). A shadow of the original edge has a luminance lower than those of pixels therearound. Therefore, the sign of the luminance difference value g(x) changes from plus to minus as seen from an outer side in the main scanning direction. The white streak has a luminance higher than those of pixels therearound. Therefore, the sign of the luminance difference value g(x) changes from minus to plus as seen from the outer side in the main scanning direction. The original size detection device 409 distinguishes the white streak in accordance with the change in sign. As described above, the luminance difference value g(x) can be used for distinguishing the original edge from the original pressing member 105 and the white streak. However, the luminance difference value g(x) becomes larger also when dust, hair, or other dirt is read. Therefore, it is difficult for the original size detection device 409 to use the luminance difference value g(x) to distinguish the original edge from the pixel that is given when the dirt is read.

The original size detection device 409 compares the difference value h(x) with the second threshold value TH2 to distinguish the original edge from the pixel that is given when the dirt is read. A shadow caused by the original edge and a shadow caused by dirt often differ in luminance characteristics. The shadow caused by the original edge is a blurred shadow due to the influence of diffusion light of the illumination portions 201a and 201b. The shadow caused by dirt is clearer than the shadow caused by the original edge because the dirt itself is often dark. Therefore, the luminance value of the shadow caused by dirt is lower than the luminance value of the shadow caused by the original edge. That is, the difference value h(x) in a range including the shadow caused by the original edge is smaller than the difference value h(x) in a range including the shadow caused by dirt. Therefore, what causes the shadow can be determined by distinguishing the difference values h(x) by an appropriate second threshold value TH2. The second threshold value TH2 is set to such a value described above. However, with the luminance difference value g(x) and the difference value h(x), the original size detection device 409 may sometimes falsely detect an original edge of a black original without margin as dust, hair, or other dirt.

The original size detection device 409 compares the average value i(x) with a third threshold value TH3 to distinguish the original edge of the black original without margin from the pixel given when dirt is read. When the original A is a black original having no margin, the average value i(x) of the luminance values of the pixels within a predetermined range in the main scanning direction in the vicinity of the original edge is smaller than the average value i(x) in a case in which the luminance value caused by dirt is included. This is because the average value i(x) includes many luminance values of the original edge of the black original. Dirt is small or has a streak shape in many cases, and hence, when the average of the luminance values is calculated in a range that is large to some extent, only small influence is caused by the dirt, and the average i(x) includes many luminance values caused by the white color of the original pressing member 105. Therefore, the average value i(x) is increased when the luminance value caused by the dirt is included. What causes the shadow can be determined by distinguishing such average values i(x) by an appropriate third threshold value TH3. The third threshold value TH3 is set to such a value described above.

The original size detection device 409 performs determination with use of the luminance difference value g(x), the difference value h(x), and the average value i(x) in combination, thereby being capable of accurately distinguishing whether or not the pixel of interest is an original edge image. Further, as illustrated in FIG. 7, the original size detection device 409 counts the number of original edge pixels in a plurality of lines in the sub-scanning direction to suppress the influence of noise or other factors, thereby being capable of improving the detection accuracy for the original edge. When a plurality of original edge positions detected through the original edge detection are present, the original size detection device 409 sets a position on the outermost side as the original edge position. With this, the possibility of falsely detecting a table or a line in the original A as the original edge is reduced.

In FIG. 7, the original edge is detected based on the count number of candidate pixels of the original edge. The candidate pixel of the original edge is determined in the main scanning direction. The processing is repeated for N lines so that it can be determined whether or not the pixel at the same position in the main scanning direction is the candidate pixel of the original edge and at least a predetermined number of candidate pixels are present in the sub-scanning direction. The predetermined number corresponds to the fourth threshold value TH4. In the example of FIG. 7, there are seven candidate pixels of the original edge in the eighth pixels from the left end in the main scanning direction. Therefore, it is determined that the eighth pixels from the left end in the main scanning direction are the original edge. The candidate pixels of the original edge are present in the third pixel, the fourteenth pixels, and the sixteenth pixel from the left end in the main scanning direction, but the number of the candidate pixels is smaller than the predetermined number (fourth threshold value TH4), and hence the candidate pixels are not determined as the original edge. As described above, even when dirt that may cause false detection in one-line processing appears, the original edge can be detected with high accuracy while the influence by the dirt can be suppressed.

In the image reading apparatus 10 configured as described above, even if the platen cover 104 is in the open state at the time of detecting the original size, it is possible to minimize the dazzling felt by the user since the lighting time of the illumination portion 201 is short. Even in this case, the image reading apparatus 10 can accurately detect the edge of the original, therefore, it can accurately determine the original size.

Figure 8:
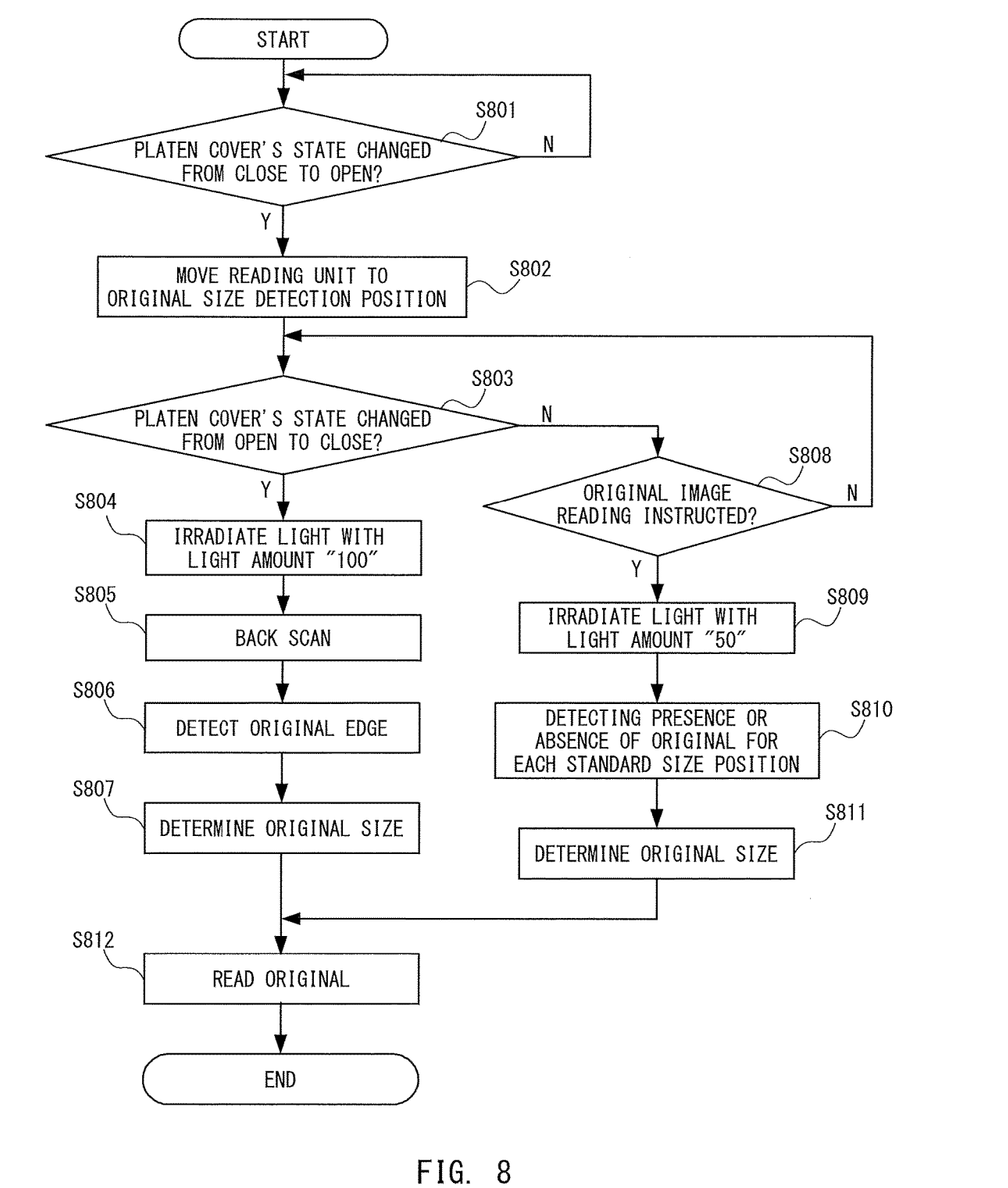
FIG. 8 is another flowchart for illustrating original image reading processing including original size detection processing.

FIG. 8 is another flowchart for illustrating original image reading processing including original size detection processing performed by the image reading apparatus 10. The processing of Step S801 to Step S807 is the same as the processing of Step S501 to Step S507, and hence description thereof is omitted. However, it is noted that, in Step S804, the control unit 400 controls the illumination portion 201 to irradiate light with light amount being "100".

In a case where an instruction for image reading is input with the platen cover 104 being in the open state (Step S803: N, Step S808: Y), the control unit 400 controls the illumination portion 201 to irradiate light with the light amount "50" (Step S809). That is, the control unit 400 reduces the light quantity of the illumination portion 201 in a case where the platen cover 104 is in the open state, as compared with a case where the platen cover 104 is in the close state. Even if the light amount is low, the original size detection unit 409 can determine presence or absence of the original A by optimizing a binarization threshold of the luminance, as in the processing of S510 in FIG. 5. At this time, the control unit 400 does not move the illumination portion 201. The control unit 400 maintains the illumination portion 201 at the original size detection position, and performs the flash lighting. Thereby, the control unit 400 can detect the original edge correctly, and can determine the original size with high precision (Step S811).

After determining the original size, the control unit 400 reads original image of the original A placed on the original table, as in the processing in Step S512 in FIG. 5 (Step S812). With the processing described above, the original size of the original A placed on the original table 102 is determined, and an original image is read. Image data representing the read original image is, for example, transmitted to the image forming apparatus 40 and used for the image forming processing on the recording material by the image forming device 411.

In the image reading apparatus 10 configured as described above, even if the platen cover 104 is in the open state at the time of detecting the original size, it is possible to minimize the dazzling felt by the user since the light amount irradiated from the illumination portion 201 is decreased. Even in this case, the image reading apparatus 10 can accurately detect the edge of the original, therefore, it can accurately determine the original size. Further, it is possible to perform a copying process in which an original image is formed on a recording material having a size corresponding to an original size of the original A. Since the original size is accurately detected, it is possible to appropriately determine the size of the recording material on which the original image is formed, thus, the original image is copied without any defected portion.

In the above embodiment, instead of moving the reading unit 103 in the sub-scanning direction as shown in FIG. 2, the image reading apparatus 10 may employ another reading unit.

For example, the reading unit may be an reading unit in which a reading position moves by moving an illumination portion and a reflecting mirror without moving the imaging lens 203 and the light receiving portion.

Further, the platen cover opening/closing sensor 107 in the above embodiment is configured to detect the open state and the closed state. However, in addition to the closed state, the platen cover opening/closing sensor 107 may detect a plurality of open states, by detecting an angle of the platen cover with respect to the original table 102, for example. By detecting a plurality of open states, it is possible to control the timing at which the processing of S501 and S503 are performed with higher accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-086671, filed Apr. 25, 2017 which is hereby incorporated by reference herein in its entirety.

What is claimed is:

1. An original reading apparatus comprising:
    an original table for placing an original subjected to reading;
    a reader, which includes an illumination portion for irradiating a reading position with light, and is configured to read the original while moving the reading position in a first direction beneath the original table;
    a platen cover mounted to the original table so as to be openable and closable with respect to the original table;
    an open/close sensor configured to detect an open/close state of the platen cover with respect to the original table;
    a controller configured to control the illumination portion and to determine the size of the original based on image data output from the reader;
    wherein the controller is configured to:
        control the illumination portion to irradiate, in a case where an instruction for reading the original is received with a detection result of the open/close sensor being a first state, a predetermined position with light for a first duration to determine the size of the original based on image data output from the reader; and
        control the illumination portion to irradiate, in response to a change of the detection result of the open/close sensor from the first state to the second state, the reading position with light for a second duration to determine the size of the original based on image data output from the reader, while moving the reading position from the predetermined position in a second direction;
    wherein the predetermined position is a position between a front-end and a rear-end of the original placed on the original table, the second direction being opposite to the first direction, and the first duration being shorter than the second duration.

2. The original reading apparatus according to claim 1, wherein the controller is configured to move the reading position to the predetermined position in a state where the platen cover is not closed.

3. The original reading apparatus according to claim 2, wherein the controller is configured to:
    control the illumination portion to, in a case where an instruction for reading the original is received with the detection result of the open/close sensor being the first state, irradiate light with a light amount being lower than a light amount which is to be irradiated from the illumination portion in a case where the detection result of the open/close sensor is changed from the first state to the second state.

4. The original reading apparatus according to claim 2, wherein the controller is configured to:
    binarize, in a case where an instruction for reading the original is received with the detection result of the open/close sensor being the first state, a luminance of a position in the main scanning direction with a predetermined threshold, based on image data of one reading processing output from the reader; and
    determine the size of the original to determine the size of the original using the binarized luminance.

5. The original reading apparatus according to claim 4, wherein the controller is configured to:
    determine presence/absence of the original using the binarized luminance value; and
    determine the size of the original according to the position at which presence of the original is determined.

6. The original reading apparatus according to claim 4, wherein the controller is configured to:
    determine presence/absence of the original for each standard size position in the main scanning direction using the binarized luminance; and
    determine the size of the original according to the standard size position at which presence of the original is determined.

7. The original reading apparatus according to claim 1, wherein the controller is configured to:
    calculate, in a case where the detection result of the open/close sensor is changed from the first state to the second state, a first difference value and a second difference value from the image data of a predetermined number of lines output from the reader;

wherein the first difference value is a value between luminance values of two pixels that are each separated from a pixel of interest at a predetermined position in the main scanning direction by a first distance; and wherein the second difference value is a value between a maximum luminance value and a minimum luminance value within a range of being separated from the pixel of interest by a second distance larger than the first distance;

determine whether or not the pixel of interest is an original edge based on the first difference value and the second difference value; and detect a size of the original in accordance with a position of the pixel of interest in a case where the pixel of interest is the original edge.

8. An original size detecting method, which is performed by an apparatus including:

an original table for placing an original subjected to reading;

a platen cover mounted to the original table so as to be openable and closable with respect to the original table;

an open/close sensor configured to detect an open/close state of the platen cover with respect to the original table;

a reader, which includes a sensor and an illumination portion for irradiating the reading position with light, and is configured to read an original while moving the reading position in a first direction beneath the original table; and a controller, wherein the method comprises:

controlling, by the controller, the illumination portion to irradiate, in a case where an instruction for reading the original is received with a detection result of the open/close sensor being a first state, a predetermined position with light for a first duration to determine the size of the original based on image data output from the reader, the predetermined position being a position between a front-end and a rear-end of the original placed on the original table; and controlling, by the controller, the illumination portion to irradiate, in response to a change of the detection result of the open/close sensor from the first state to the second state, the reading position with light for a second duration in which the first duration is shorter than the second duration to determine the size of the original based on image data output from the reader, while moving the reading position from the predetermined position in a second direction which is opposite to the first direction.

9. The original size detecting method according to claim 8, further comprising:

moving, by the controller, the reading position to the predetermined position in a state where the platen cover is not closed.

10. The original size detecting method according to claim 9, further comprising:

controlling, by the controller, the illumination portion to, in a case where an instruction for reading the original is received with the detection result of the open/close sensor being the first state, irradiate light with a light amount being lower than a light amount which is irradiated from the illumination portion in a case where the detection result of the open/close sensor is changed from the first state to the second state.

11. The original size detecting method according to claim 9, further comprising:

binarizing, by the controller, in a case where an instruction for reading the original is received with the detection result of the open/close sensor being the first state, a luminance of a position in the main scanning direction with a predetermined threshold based on image data of one reading processing output from the reader; and determining, by the controller, the size of the original to determine the size of the original using the binarized luminance.

12. The original size detecting method according to claim 11, further comprising:

determining, by the controller, presence/absence of the original using the binarized luminance value; and determining, by the controller, the size of the original according to the position at which presence of the original is determined.

13. The original size detecting method according to claim 11, further comprising:

determining, by the controller, presence/absence of the original for each standard size position in the main scanning direction using the binarized luminance; and determining, by the controller, the size of the original according to the standard size position at which presence of the original is determined.

14. The original size detecting method according to claim 8, further comprising:

calculating, by the controller, in a case where the detection result of the open/close sensor is changed from the first state to the second state, a first difference value and a second difference value from the image data of a predetermined number of lines output from the reader;

wherein the first difference value is a value between luminance values of two pixels that are each separated from a pixel of interest at a predetermined position in the main scanning direction by a first distance; and wherein the second difference value is a value between a maximum luminance value and a minimum luminance value within a range of being separated from the pixel of interest by a second distance larger than the first distance;

determining, by the controller, whether or not the pixel of interest is an original edge based on the first difference value and the second difference value; and detecting, by the controller, a size of the original in accordance with a position of the pixel of interest in a case where the pixel of interest is the original edge.

* * * * *